United States Patent
Fan

(10) Patent No.: US 7,433,182 B2
(45) Date of Patent: Oct. 7, 2008

(54) PLUG-AND-EXPAND BATTERY MODULE

(75) Inventor: Yung-Kang Fan, Banciao (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 408 days.

(21) Appl. No.: 11/125,236

(22) Filed: May 10, 2005

(65) Prior Publication Data

US 2006/0133021 A1    Jun. 22, 2006

(30) Foreign Application Priority Data

Dec. 17, 2004    (TW)    ................. 93139556 A

(51) Int. Cl.
    *G06F 1/16*    (2006.01)
(52) U.S. Cl. .................................... 361/683
(58) Field of Classification Search ............. 361/683
    See application file for complete search history.

(56) References Cited

U.S. PATENT DOCUMENTS

| | | | | |
|---|---|---|---|---|
| 4,926,365 A * | 5/1990 | Hsieh | ........................ | 361/683 |
| 5,153,817 A * | 10/1992 | Hosoi et al. | ................. | 361/685 |
| 5,293,300 A * | 3/1994 | Leung | ........................ | 361/683 |
| 6,002,583 A * | 12/1999 | Shoji et al. | .................. | 361/683 |
| 6,078,496 A * | 6/2000 | Oguchi et al. | ............... | 361/683 |
| 6,191,941 B1 * | 2/2001 | Ito et al. | ..................... | 361/683 |
| 6,385,039 B1 * | 5/2002 | Chiang et al. | ............... | 361/683 |
| 6,385,041 B1 * | 5/2002 | Choi | .......................... | 361/686 |
| 6,452,795 B1 * | 9/2002 | Lee | ............................ | 361/686 |
| 6,535,378 B1 * | 3/2003 | Oguchi et al. | ............... | 361/683 |
| 6,639,790 B2 * | 10/2003 | Tsai et al. | .................... | 361/683 |
| 6,795,305 B2 * | 9/2004 | Tanaka et al. | .............. | 361/683 |
| 6,894,893 B2 * | 5/2005 | Hidesawa | ................... | 361/683 |
| 7,236,356 B2 * | 6/2007 | Ulla et al. | .................... | 361/683 |
| 2004/0246670 A1 * | 12/2004 | Lai | ............................ | 361/683 |

* cited by examiner

*Primary Examiner*—Lisa Lea-Edmonds
(74) *Attorney, Agent, or Firm*—Rosenberg, Klein & Lee

(57) ABSTRACT

A plug-and-expand battery module includes at least one battery cell therein, which is provided with a plug member adapted to insert into a power input of a portable electronic apparatus, and a socket member adapted to receive the plug member of another battery module. The battery module is internally provided with a battery connecting circuit for connecting the battery cells to one another, and to the plug and socket members. Thus, when the plug member of the battery module is inserted into the power input of the portable electronic apparatus, power is supplied from all the battery modules connected via the plug and the socket members thereof. The battery module is also internally provided with a battery protection to prevent discharge of a battery module having a higher voltage to another battery module having a lower voltage when several battery modules are parallelly connected to supply power.

18 Claims, 7 Drawing Sheets

PLUG-AND-EXPAND BATTERY MODULE

FIELD OF THE INVENTION

The present invention relates to a battery module for portable electronic apparatus, and more particularly to a plug-and-expand battery module for supplying working power needed by a portable electronic apparatus.

BACKGROUND OF THE INVENTION

Portable electronic apparatus are widely employed in nowadays commercial and industrial society, and typically include notebook computers, mobile communication apparatus, portable detecting instruments, portable audio-visual equipment and aids, etc. With the use or the assistance of these portable electronic apparatus, the highest possible working efficiency, activity effect, and living conditions may be achieved.

These portable electronic apparatus are powered by batteries. Most consumers would request for batteries having long battery life, good power supply efficiency, stable output, good expandability, and high battery capacity. Among others, lithium battery is the currently available battery that has best power supply efficiency. However, even the lithium battery fails to satisfy the consumers in terms of the above-mentioned requirements.

Generally, the currently widely used notebook computer can have only one battery mounted thereto and therefore has operating time largely limited by the battery life or the battery capacity. In the case there is not an external power supply available for use, a user has to prepare several pieces of backup batteries for the notebook computer. To replace the battery, it is necessary to power down the notebook computer first and inevitably interrupts the work being proceeded with to adversely affect the working efficiency.

For some works, such as monitoring, data operating, etc., which do not allow any interruption of power supply or program execution, the replacement of an exhausted battery of the notebook computer would inevitably interrupt the whole work.

To overcome the above-mentioned problems existed in the conventional batteries, and to satisfy most consumers' demands for better batteries, battery manufacturers have developed the so-called main battery and second battery. However, these batteries fail to meet the requirements of convenient for use and good expandability in use. They simply complicate the manufacturing and bring troubles in stock management.

It is therefore desirable to develop a conveniently expandable battery that provides enhanced battery capacity and is particularly suitable for use with a portable electronic apparatus.

SUMMARY OF THE INVENTION

A primary object of the present invention is to provide an expandable battery module adapted to provide a portable electronic apparatus with relatively high power capacity, and allowing a user to parallelly connect different numbers of the expandable battery modules depending on actual need.

Another object of the present invention is to provide a plug-and-expand battery module that is provided with simple plug and socket structures to allow parallel connection of two or more of such battery modules by plugging one battery module in another battery module, so as to enable increased power supply time needed by a portable electronic apparatus.

A further object of the present invention is to provide a plug-and-expand battery module that can be directly plugged in and thereby parallelly connected to a power-low battery module originally mounted on a portable electronic apparatus to supply power to the portable electronic apparatus and prevent any damage or loss caused by any interruption of power supply.

To achieve the above objectives, in accordance with the present invention, a plug-and-expand battery module includes at least one battery cell therein, which is provided with a plug member adapted to insert into a power input of a portable electronic apparatus, and a socket member adapted to receive the plug member of another battery module. The battery module is internally provided with a battery connecting circuit for connecting the battery cells to one another, and to the plug and socket members. Thus, when the plug member of the battery module is inserted into the power input of the portable electronic apparatus, power is supplied from all the battery modules connected via the plug and the socket members thereof. The battery module is also internally provided with a battery protection to prevent discharge of a battery module having a higher voltage to another battery module having a lower voltage when several battery modules are parallelly connected to supply power.

With the above arrangements, the plug-and-expand battery module of the present invention is easily portable and expandable. And, the plug-and-expand battery module can be expanded without the need of powering off the notebook computer or being removed from the battery seat of the notebook computer. For battery manufacturers and/or notebook computer manufacturers, it is no longer necessary to produce the so-called main battery and second battery. Moreover, since all the plug-and-expand battery modules of the present invention have plug member and socket member in the same specification, the production of battery modules may be simplified and it is not necessary to carry a large stock of differently designed batteries.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
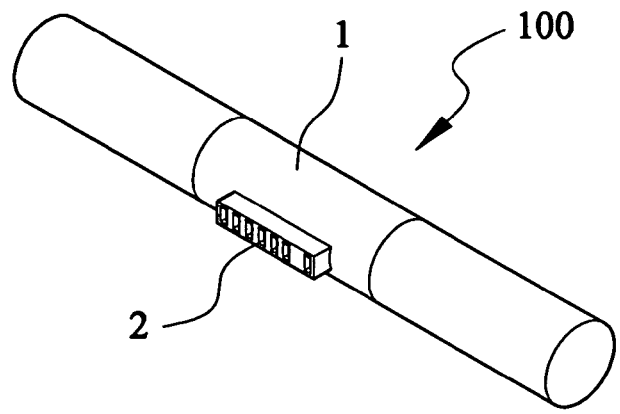
FIG. 1 is a front perspective view of a plug-and-expand battery module according to a first embodiment of the present invention.
Figure 2:
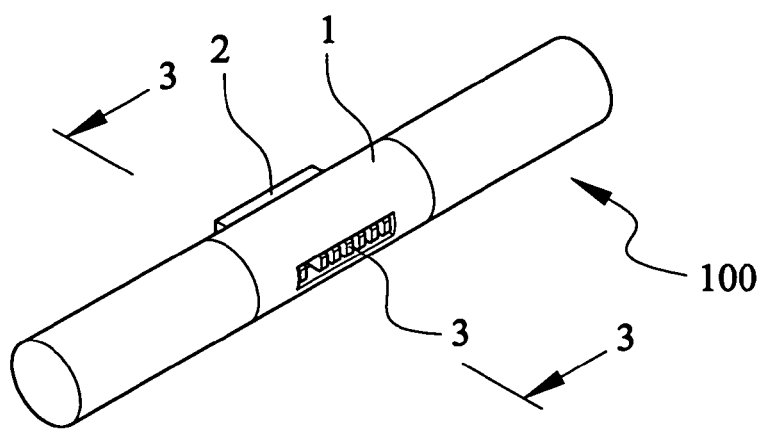
FIG. 2 is a rear perspective view of the plug-and-expand battery module of FIG. 1.
Figure 3:
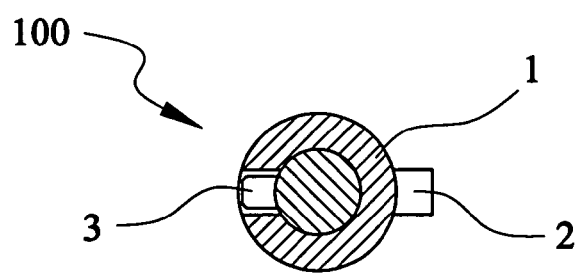
FIG. 3 is a sectional view taken along line 3-3 of FIG. 2.

Please refer to FIGS. 1 and 2 that are front and rear perspective views, respectively, of a plug-and-expand battery module 100 according to a first embodiment of the present invention, and to FIG. 3 that is a sectional view taken along line 3-3 of FIG. 2. As shown, the plug-and-expand battery module 100 includes one or more battery cells 1 connected in series or in parallel. One of the battery cells 1 constituting the plug-and-expand battery module 100 is provided at two diametrically opposite positions with a plug member 2 and a socket member 3 each, such that the plug and socket members 2, 3 are located in the same horizontal plane.

Figure 4:
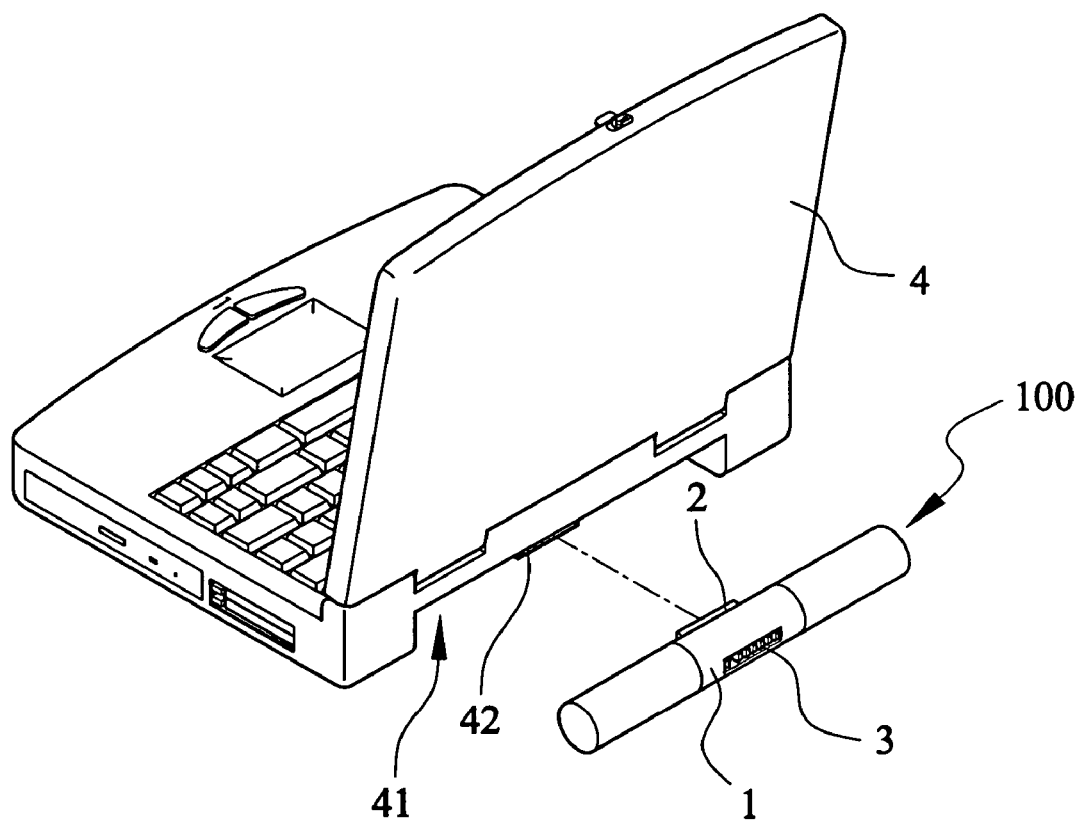
FIG. 4 is an exploded rear perspective view showing the connection of one plug-and-expand battery module of FIG. 1 to a battery seat on a notebook computer.
Figure 5:
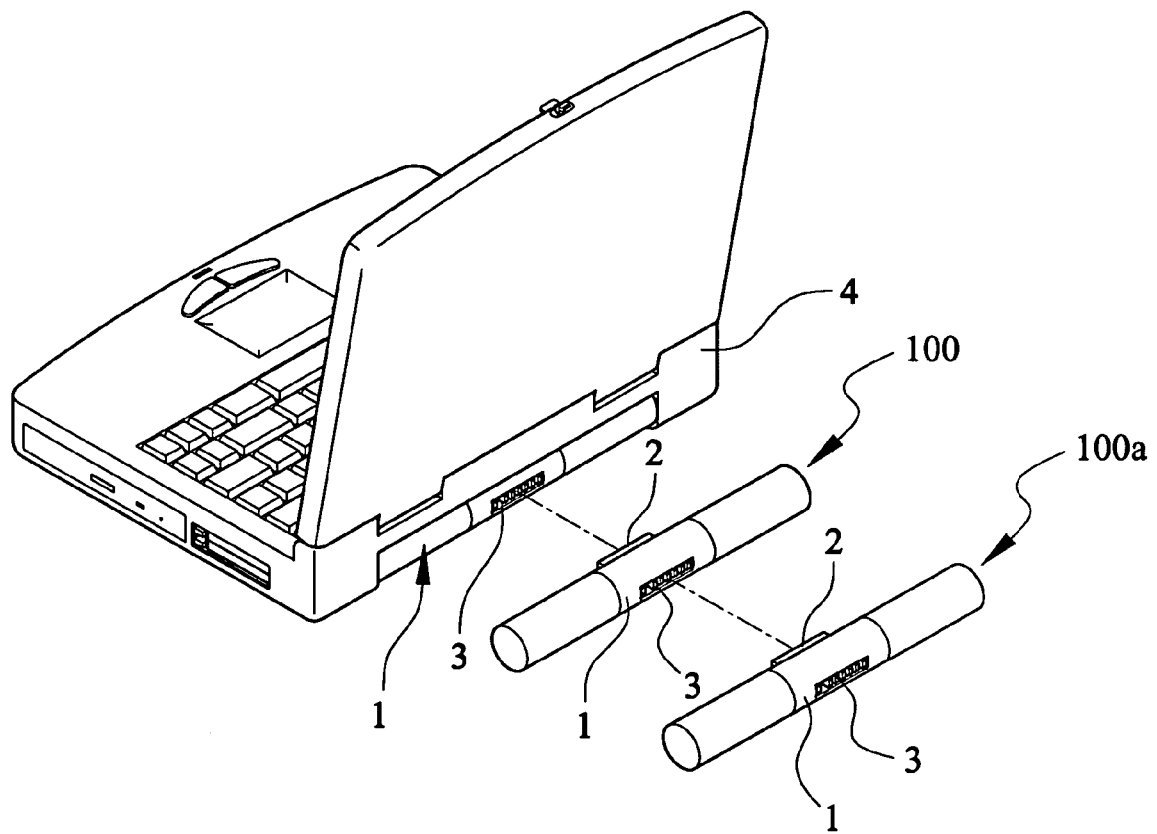
FIG. 5 is an exploded rear perspective view showing the connection of two plug-and-expand battery modules of FIG. 1 to a battery seat on a notebook computer.

The plug-and-expand battery module 100 is available for supplying working power needed by a portable electronic apparatus, such as a notebook computer 4 as shown in FIGS. 4 and 5. It is understood the plug-and-expand battery module 100 of the present invention may also be used to supply the working power needed by other types of battery-operated portable electronic apparatus.

The plug-and-expand battery module 100 is connected to the notebook computer 4 by inserting the plug member 2 into a power input 42 in a battery seat 41 provided at a rear side of the notebook computer 4, as shown in FIG. 4, so that the plug-and-expand battery module 100 is firmly associated with the battery seat 41 of the notebook computer 4 to supply power from the battery cells 1 of the battery module 100 to the notebook computer 4.

When it is desired to expand the first battery module 100 connected to the notebook computer 4, simply align and insert the plug member 2 of a second battery module 100a into the socket member 3 of the first battery module 100, as shown in FIG. 5, and the first and the second battery modules 100, 100a together supply battery power to the notebook computer 4.

Figure 6:
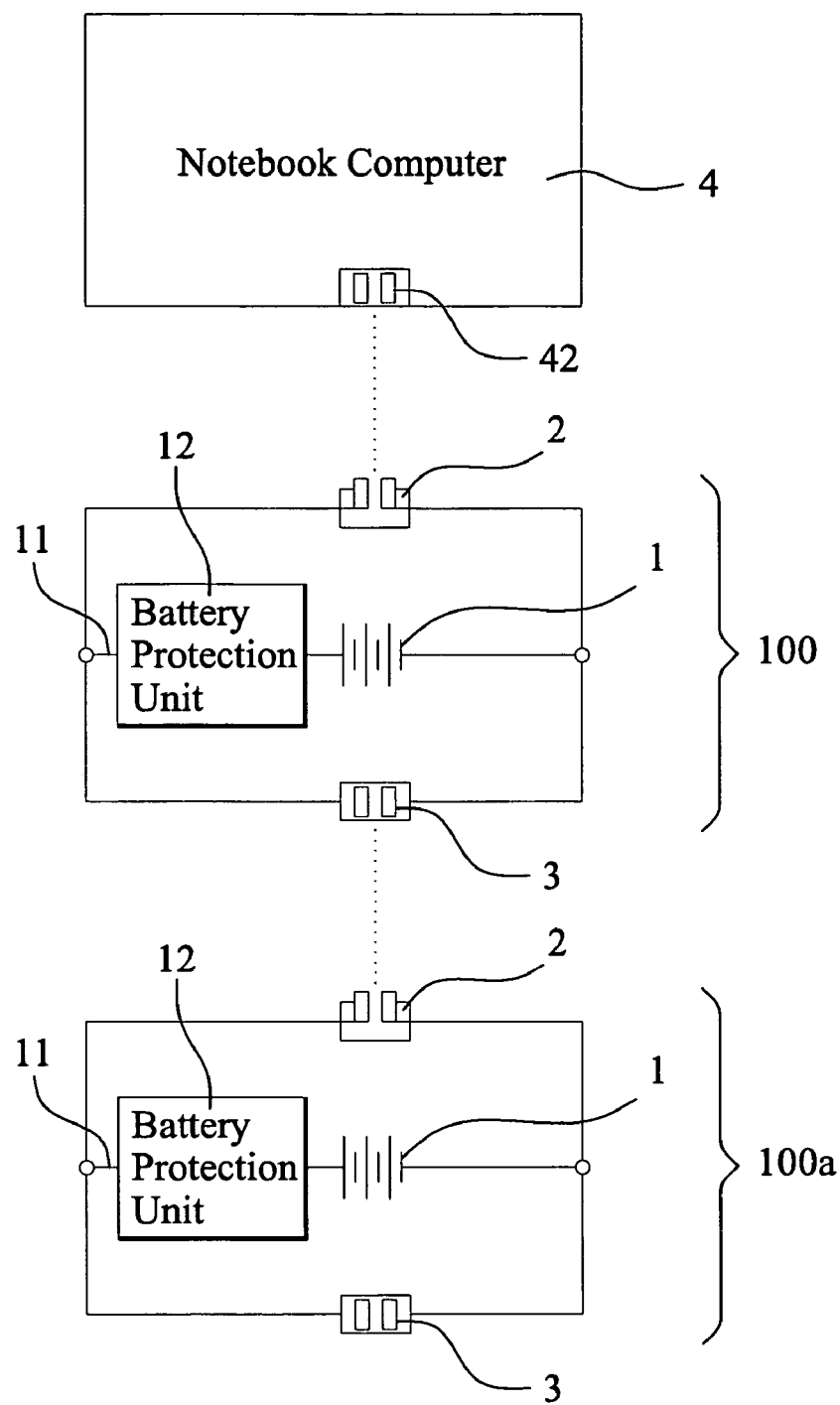
FIG. 6 is a schematic circuit diagram showing the connection of two plug-and-expand battery modules of FIG. 1 to a notebook computer as shown in FIG. 5.

FIG. 6 is a schematic circuit diagram showing the connection of two plug-and-expand battery modules 100, 100a to the notebook computer 4, as shown in FIG. 5. It can be clearly seen from FIG. 6 that the battery cells 1 of the first plug-and-expand battery module 100 are connected in series, and the voltage of the battery cells 1 are separately applied across the plug member 2 and the socket member 3 via a battery connecting circuit 11 in the battery module 100, so that power is supplied from the first plug-and-expand battery module 100 to the notebook computer 4 when the plug member 2 of the first plug-and-expand battery module 100 is inserted into the power input 42 of the notebook computer 4.

In the battery connecting circuit 11 of the first plug-and-expand battery module 100, there may be included a battery protection unit 12 to ensure the safety use of the battery cells 1 of the first battery module 100. For instance, the battery protection unit 12 may be a conventional reversed current protecting diode, or a conventional battery overheating trip-off element.

Alternatively, the first plug-and-expand battery module 100 may be internally provided with a battery protection, such as a comparison circuit or any other functionally equivalent circuit, to prevent a battery module having higher voltage from discharging to another battery module having lower voltage when a plurality of expandable battery modules having different voltages are parallelly connected by inserting the plug member 2 of one battery module into the socket member 3 of another battery module.

The second plug-and-expand battery module 100a also includes a plurality of battery cells 1, a battery connecting circuit 11, and a battery protection unit 12; and the voltage of the battery cells 1 is applied across the plug member 2 and the socket member 3 via the battery connecting circuit 11 and the battery protection unit 12.

When the plug member 2 of the second plug-and-expand battery module 100a is aligned and inserted into the socket member 3 of the first plug-and-expand battery module 100, the two battery modules 100, 100a together supply power to the notebook computer 4.

With the above arrangements, the plug-and-expand battery module of the present invention is easily portable and expandable. And, the plug-and-expand battery module can be expanded without the need of powering off the notebook computer or being removed from the battery seat of the notebook computer. For battery manufacturers and/or notebook computer manufacturers, it is no longer necessary to produce the so-called main battery and second battery. Moreover, since all the plug-and-expand battery modules of the present invention have plug member 2 and socket member 3 in the same specification, the production of battery modules may be simplified and it is not necessary to carry a large stock of differently designed batteries.

Figure 7:
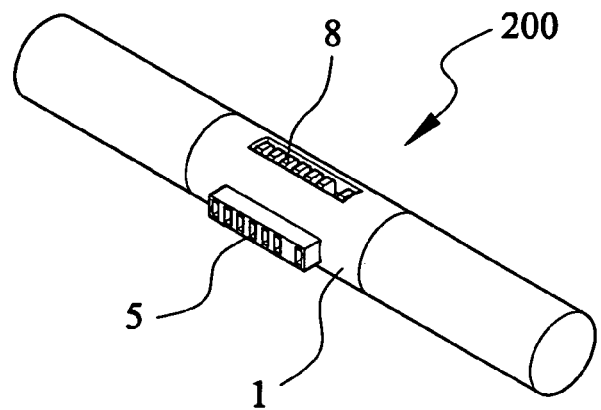
FIG. 7 is a front perspective view of a plug-and-expand battery module according to a second embodiment of the present invention.
Figure 8:
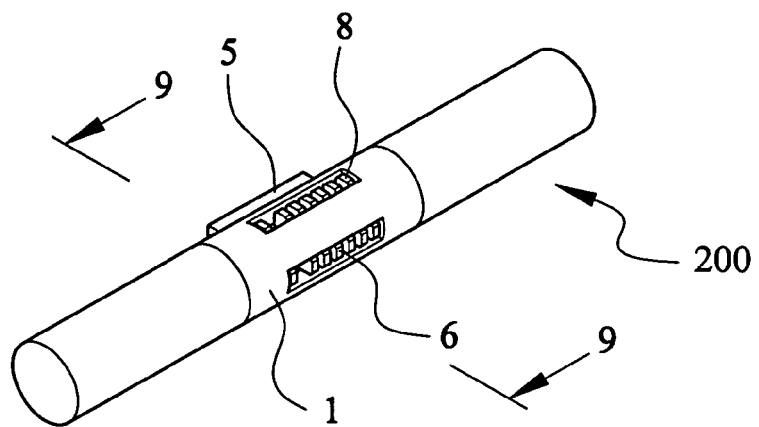
FIG. 8 is a rear perspective view of the plug-and-expand battery module of FIG. 7.
Figure 9:
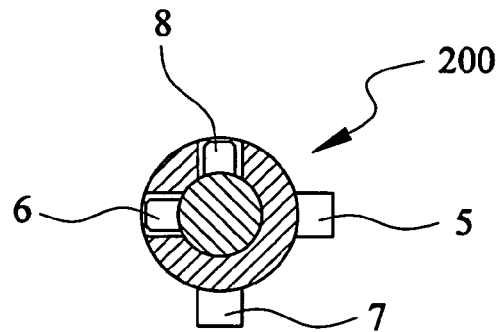
FIG. 9 is a sectional view taken along line 9-9 of FIG. 8.

FIGS. 7 and 8 are front and rear perspective views, respectively, of a plug-and-expand battery module 200 according to a second embodiment of the present invention, and FIG. 9 is a sectional view taken along line 9-9 of FIG. 8. As shown, the plug-and-expand battery module 200 in the second embodiment is generally structurally similar to the plug-and-expand battery module 100 in the first embodiment. Therefore, components that are common to the two embodiments are denoted with the same reference numerals.

One of the battery cells 1 constituting the plug-and-expand battery module 200 in the second embodiment is provided at two diametrically opposite positions with a first plug member 5 and a first socket member 6 each, such that the first plug and socket members 5, 6 are located in the same horizontal plane; and at another two diametrically opposite positions with a second plug member 7 and a second socket member 8 each, such that the second plug and socket members 7, 8 are located in the same horizontal plane that is perpendicular to the horizontal plane in which the first plug and socket members 5, 6 are located.

Figure 10:
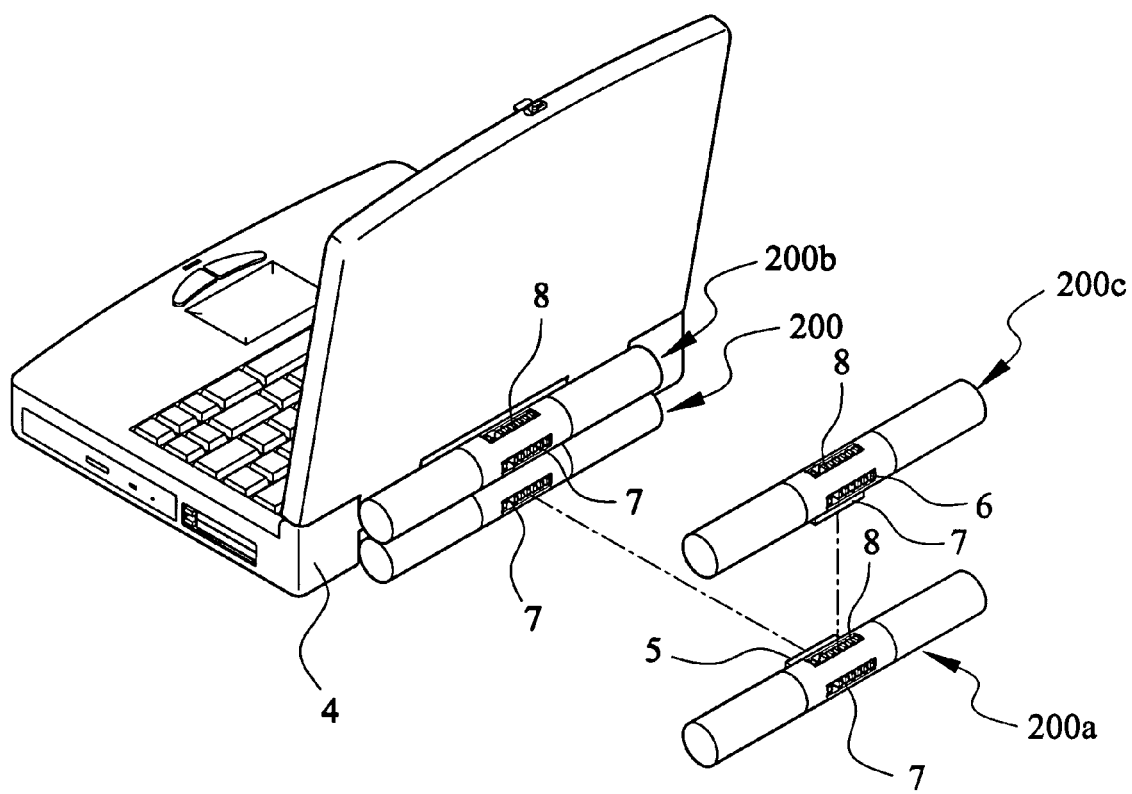
FIG. 10 is a partially exploded rear perspective view showing the connection of four plug-and-expand battery modules of FIG. 7 to a battery seat on a notebook computer.

Please refer to FIG. 10. When it is desired to expand a first battery module 200 connected to the notebook computer 4, first align and insert the first plug member 5 of a second battery module 200a into the first socket member 6 of the first battery module 200, and then align and insert the second plug member 7 of a third battery module 200b into the second socket member 8 of the first battery module 200, and then align and insert the second plug member 7 of a fourth battery module 200c into the second socket member 8 of the second battery module 200a, and the first, the second, the third, and the fourth battery modules 200, 200a, 200b, and 200c may together supply battery power to the notebook computer 4.

Figure 11:
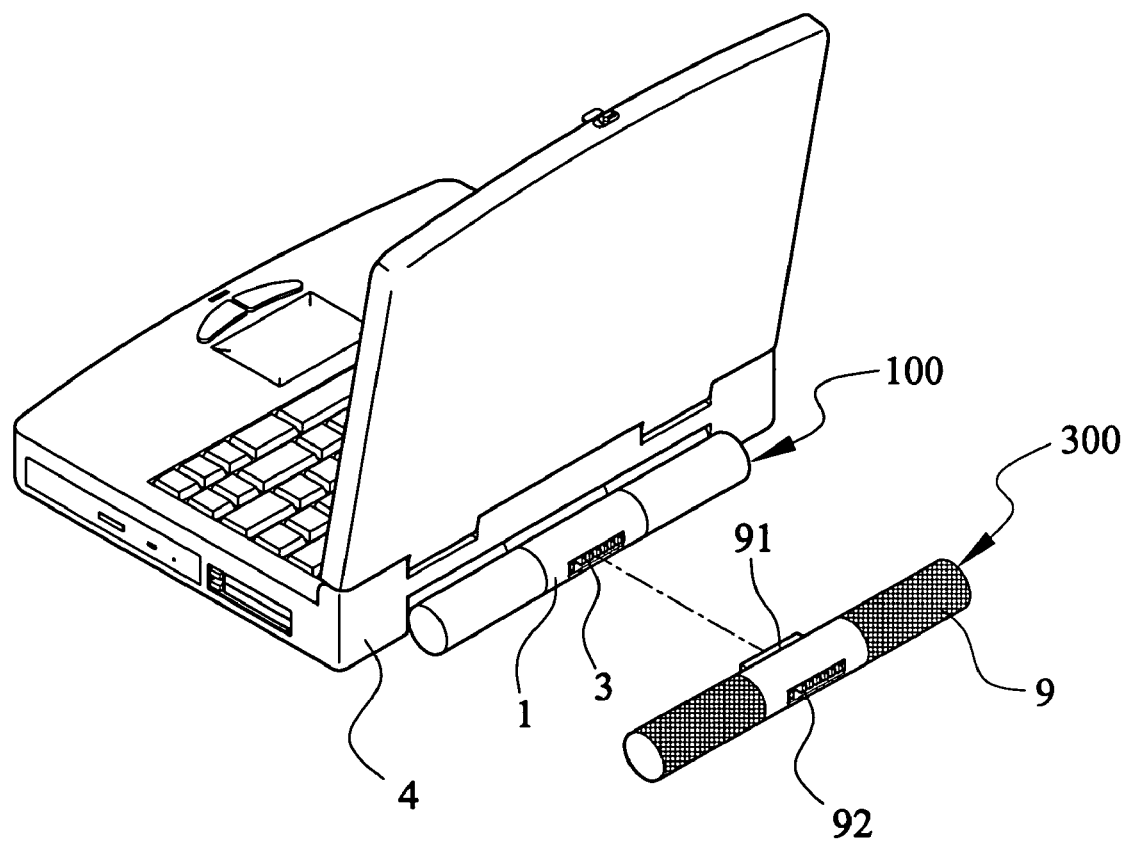
FIG. 11 is a partially exploded rear perspective view showing the connection of a speaker module to a notebook computer via a plug-and-expand battery module according to a third embodiment of the present invention.

FIG. 11 shows a plug-and-expand battery module 100 according to a third embodiment of the present invention, via which a speaker module 300 may be associated with a notebook computer 4. The plug-and-expand battery module 100 in the third embodiment includes one or more battery cells 1, and one of the battery cells 1 is provided at two diametrically opposite positions with a plug member 2 and a socket member 3 each, such that the plug and socket members 2, 3 are located in the same horizontal plane. The speaker module 300 includes at least one speaker 9 that is provided at two predetermined positions with a plug member 91 and a socket member 92 each. When the plug member 91 of the speaker module 300 is aligned and inserted into the socket member 3 of the battery module 100, the speaker module 300 may obtain working power from the plug-and-expand battery module 100.

By way of general mechanism designing techniques, it is possible to provide the plug-and-expand battery module of the present invention with rotatable plug and socket members, so that a plurality of the plug-and-expand battery modules of the present invention may be more flexibly connected to one anther.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A plug-and-expand battery module, comprising:
   a first expandable battery module including at least one battery cell therein;
   a first plug member provided on the first expandable battery module, adapted to be selectively inserted into a power input of a portable electronic apparatus or a second socket member of a second expandable battery module;
   a first socket member provided on the first expandable battery module, adapted to be inserted by a second plug member of the second expandable battery module;
   a battery connecting circuit for connecting the battery cells in the first expandable battery module to the first plug member and the first socket member;
   wherein the first plug member of the first expandable battery module has a dimension substantially same to the second plug member of the second expandable battery module, and the first socket member of the first expandable battery module has a dimension substantially same to the second socket member of the second expandable battery module;
   whereby when the first socket member of the first expandable battery module is inserted by the second plug member of the second expandable battery module, a power energy supplied by the first expandable battery module and the second expandable battery module is supplied to the first plug member of the first expandable battery module.

2. The plug-and-expand battery module as claimed in claim 1, wherein the first plug member and the first socket member are provided at two diametrically opposite positions on the first expandable battery module to locate in a horizontal plane.

3. The plug-and-expand battery module as claimed in claim 1, wherein the first plug member further comprises:
   a third plug member provided on the first expandable battery module and connected to the battery cells in the first expandable battery module via the battery connecting circuit; and
   a third socket member provided on the first expandable battery module and connected to the battery cells in the first expandable battery module via the battery connecting circuit.

4. The plug-and-expand battery module as claimed in claim 1, wherein the battery connecting circuit further includes a battery protection unit therein.

5. The plug-and-expand battery module as claimed in claim 1, wherein the battery cells in the first expandable battery module are connected in series via the battery connecting circuit.

6. The plug-and-expand battery module as claimed in claim 1, wherein the portable electronic apparatus is a notebook computer.

7. The plug-and-expand battery module as claimed in claim 1, further comprising a speaker module having a plug member adapted to insert into the first socket member of the expandable battery module.

8. A plug-and-expand battery module, comprising:
   a first expandable battery module, comprising:
   at least one battery cell therein;
   a first plug member provided on the expandable battery module for inserting into a power input of a portable electronic apparatus;
   a first socket member provided on the first expandable battery module;
   a battery connecting circuit for connecting the battery cells in the first expandable battery module to the first plug member and the first socket member;
   whereby when the first plug member of the expandable battery module is inserted into the power input of the portable electronic apparatus, a power energy is supplied from the first expandable battery module to the portable electronic apparatus via the first plug member;
   at least one second expandable battery module, each comprising:
   at least one battery cell therein;
   a second plug member provided on the second expandable battery module;
   a second socket member provided on the second expandable battery module; and
   a battery connecting circuit for connecting the battery cells in the second expandable battery module to the second plug member and the second socket member of the second expandable battery module;
   wherein the first plug member of the first expandable battery module has a dimension substantially same to the second plug member of the second expandable battery module, and the first socket member of the first expandable battery module has a dimension substantially same to the second socket member of the second expandable battery module;
   whereby when the first socket member of the first expandable battery module is inserted by the second plug member of the second expandable battery module, a power energy supplied by the first expandable battery module and the second expandable battery module is supplied from the first expandable battery module to the portable electronic apparatus via the first plug member of the first expandable battery module.

9. The plug-and-expand battery module as claimed in claim 8, wherein the first plug member and the first socket member of the first expandable battery module are provided at two diametrically opposite positions on the first expandable battery module to locate in a horizontal plane, and the second plug member and the first socket member of the second expandable battery module are provided at two diametrically opposite positions on the second expandable battery module to locate in the same horizontal plane.

10. The plug-and-expand battery module as claimed in claim 8, the first expandable battery module further comprising:
- a third plug member provided on the first expandable battery module and connected to the battery cells in the first expandable battery module via the battery connecting circuit of the first expandable battery module; and
- a third socket member provided on the first expandable battery module and connected to the battery cells in the first expandable battery module via the battery connecting circuit of the first expandable battery module;

the second expandable battery module further comprising:
- a fourth plug member provided on the second expandable battery module and connected to the battery cells in the second expandable battery module via the battery connecting circuit of the second expandable battery module; and
- a fourth socket member provided on the second expandable battery module and connected to the battery cells in the second expandable battery module via the battery connecting circuit of the second expandable battery module.

11. The plug-and-expand battery module as claimed in claim 8, wherein each the battery connecting circuits of the first expandable battery module and the second expandable battery module further includes a battery protection unit therein respectively.

12. The plug-and-expand battery module as claimed in claim 8, wherein the battery cells in the first expandable battery module and the second expandable battery module are connected in series via the battery connecting circuit respectively.

13. The plug-and-expand battery module as claimed in claim 8, wherein the portable electronic apparatus is a notebook computer.

14. The plug-and-expand battery module as claimed in claim 8, further comprising a speaker module having a plug member adapted to insert into the first socket member of the second expandable battery module.

15. A portable electronic apparatus, comprising:
- a battery seat formed on the portable electronic apparatus, the battery seat being provided with a power input;
- a first expandable battery module including at least one battery cell therein, mounted in the battery seat, comprising:
  - a first plug member provided on the first expandable battery module for inserting into the power input of the portable electronic apparatus;
  - a first socket member provided on the first expandable battery module, adapted to be inserted by a second plug member of a second expandable battery module with a second socket member;
  - a battery connecting circuit for connecting the battery cells in the first expandable battery module to the first plug member and the first socket member;
  - wherein the first plug member of the first expandable battery module has a dimension substantially same to the second plug member of the second expandable battery module, and the first socket member of the first expandable battery module has a dimension substantially same to the second socket member of the second expandable battery module;
  - whereby when the first socket member of the first expandable battery module is inserted by the second plug member of the second expandable battery module, a power energy supplied by the first expandable battery module and the second expandable battery module is supplied from the first expandable battery module to the portable electronic apparatus via the first plug member of the first expandable battery module.

16. The plug-and-expand battery module as claimed in claim 15, further comprising:
- a third plug member provided on the first expandable battery module and connected to the battery cells in the first expandable battery module via the battery connecting circuit; and
- a third socket member provided on the first expandable battery module and connected to the battery cells in the first expandable battery module via the battery connecting circuit.

17. The plug-and-expand battery module as claimed in claim 15, wherein each of the battery connecting circuits of the first expandable battery module and the second expandable battery module further includes a battery protection unit therein respectively.

18. The plug-and-expand battery module as claimed in claim 15, wherein the portable electronic apparatus is a notebook computer.

\* \* \* \* \*